United States Patent
Hillier

(10) Patent No.: US 11,803,481 B2
(45) Date of Patent: Oct. 31, 2023

(54) DATA ANONYMIZATION FOR A DOCUMENT EDITOR

(71) Applicant: HEWLETT PACKARD ENTERPRISE DEVELOPMENT LP, Houston, TX (US)

(72) Inventor: Christopher Anthony Grant Hillier, Ft. Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 975 days.

(21) Appl. No.: 16/289,000

(22) Filed: Feb. 28, 2019

(65) Prior Publication Data
US 2020/0278934 A1 Sep. 3, 2020

(51) Int. Cl.
*G06F 12/1018* (2016.01)
*G06F 16/17* (2019.01)
(Continued)

(52) U.S. Cl.
CPC ...... *G06F 12/1018* (2013.01); *G06F 16/1734* (2019.01); *G06F 16/90344* (2019.01); *G06F 21/6254* (2013.01)

(58) Field of Classification Search
CPC ............ G06F 12/1018; G06F 16/1734; G06F 16/90344; G06F 21/6254; G06F 16/3331
See application file for complete search history.

(56) References Cited

U.S. PATENT DOCUMENTS

| 8,141,149 | B1 * | 3/2012 | Henry | ................ | G06F 11/3006 |
| | | | | | 713/184 |
| 8,239,757 | B2 * | 8/2012 | Johnson | .............. | G06F 11/3684 |
| | | | | | 715/770 |

(Continued)

OTHER PUBLICATIONS

Wikipedia, Regular expression, dated Jan. 2018, downloaded from the Internet on Mar. 31, 2022, pp. 1-16, URL: http://web.archive.org/web/20180114181636/https://en.wikipedia.org/wiki/Regular_expression (Year: 2018).*

(Continued)

*Primary Examiner* — Linglan Edwards
*Assistant Examiner* — Vy H Ho
(74) *Attorney, Agent, or Firm* — Trop, Pruner & Hu, P.C.

(57) ABSTRACT

A method for anonymizing documents before publication is provided. The method includes identifying regular expressions configured to match strings to be anonymized in a document, selecting a readable identifier as an anonymized reference for a string replacement, searching the document for a match string that fits the regular expression, hashing the match string using a collision resistant, deterministic, non-inverting cryptographic hashing function, and comparing a cryptographic hash of the match string with a database including multiple previous hashes and multiple corresponding readable identifiers. When none of the previous hashes matching the cryptographic hash, the method includes creating a new database record including the cryptographic hash, incrementing a counter in the readable identifier and associating the readable identifier with the new database record, and replacing the match string with the readable identifier, throughout the document. A system and a medium storing instructions to perform the above method are also provided.

19 Claims, 8 Drawing Sheets

(51) Int. Cl.
*G06F 16/903* (2019.01)
*G06F 21/62* (2013.01)

(56) References Cited

U.S. PATENT DOCUMENTS

| | | | | |
|---|---|---|---|---|
| 9,824,236 | B2 | 11/2017 | Lynch et al. | |
| 10,963,590 | B1* | 3/2021 | Dash | G06F 21/604 |
| 11,017,778 | B1* | 5/2021 | Thomson | G10L 15/28 |
| 2008/0147554 | A1* | 6/2008 | Stevens | G16H 10/60 |
| | | | | 705/51 |
| 2012/0265724 | A1* | 10/2012 | Michelin | G06N 5/02 |
| | | | | 706/55 |
| 2015/0213288 | A1* | 7/2015 | Bilodeau | G06F 21/6254 |
| | | | | 726/26 |
| 2016/0063269 | A1* | 3/2016 | Liden | G06F 21/6245 |
| | | | | 726/26 |
| 2016/0203336 | A1 | 7/2016 | Nambiar et al. | |
| 2017/0149793 | A1 | 5/2017 | Spertus et al. | |
| 2018/0082082 | A1 | 3/2018 | Lowenberg et al. | |
| 2018/0096102 | A1* | 4/2018 | Akinmeji | G16H 10/60 |
| 2018/0267947 | A1* | 9/2018 | Miller | G06F 40/174 |
| 2018/0285597 | A1 | 10/2018 | Mahonin et al. | |
| 2018/0285599 | A1 | 10/2018 | Praveen et al. | |
| 2019/0190890 | A1* | 6/2019 | Druker | G06F 21/6245 |
| 2019/0384820 | A1* | 12/2019 | Liu | G06F 40/295 |

OTHER PUBLICATIONS

Kevin Nisbet, "The False Allure of Hashing for Anonymization," Apr. 30, 2018, pp. 1-4 (online), Retrieved from the Internet on Dec. 19, 2018 at URL: <gravitational.com/blog/hashing-for-anonymization/>.

* cited by examiner

DATA ANONYMIZATION FOR A DOCUMENT EDITOR

BACKGROUND

Typical editing algorithms that anonymize documents are configured to simply replace each personal data instance with a randomized string or a generic placeholder. This approach may render the final document unreadable, or incomprehensible, if the generic placeholder is not consistent throughout the document (e.g., the same placeholder used for the same personal data instance). For example, when the personalized string is a network address e.g., an Internet Protocol (IP) or Media Access Control (MAC) address, it may be relevant for a system administrator to keep the consistency of some of the addresses, so that a problem or issue may be properly identified, or to keep an accurate statistical track of the data. To avoid this, some approaches use reversible anonymizing algorithms so that the original information can be recovered at a desired level. However, this approach uses stored encryption keys that ultimately expose the system to a degree of risk that may be unacceptable in some applications. Some anonymization approaches include a 'tokenization' algorithm to replace personal data strings with tokens. However, secure tokens are typically unreadable or semantically incoherent, and also are vulnerable to attack as the tokens can be used to identify the original personal data.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
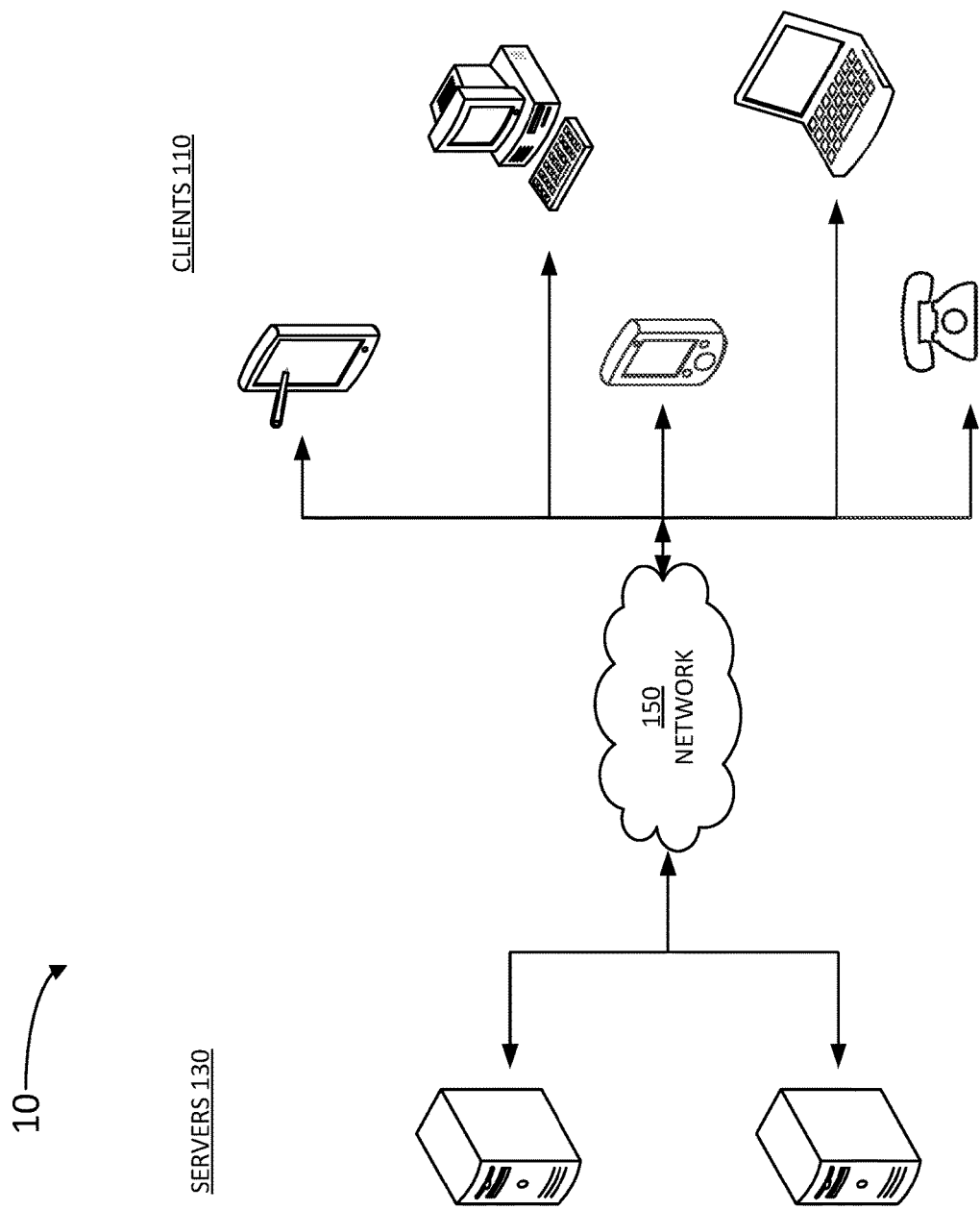
FIG. 1 is an architecture illustrating an example network suitable for publishing data anonymized documents, according to certain aspects of the disclosure.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Embodiments as disclosed herein provide a secure method for creating public documents that are readable and usable for content analysis and interpretation (e.g., by a debug processor and the like) from private documents that may include unpublishable personal data. In many instances, a device or appliance issues documentation (e.g., log files and the like) to manufacturers and other service providers that may use the information for maintenance, repair, or statistical records of an enterprise. While the manufacturer or service provider may not be interested in the personal data, it may be desirable to maintain a degree of differentiation between two different individuals or entities, as well as a track record of their nature, in the public document.

Embodiments as disclosed herein solve the above problem arising in computer technology by using a technical solution including a collision-resistant, deterministic, and non-invertible hash to replace personal data strings in a two-step process. In embodiments consistent with the present disclosure, a deterministic hash is a hash that produces the same output for a given input (e.g., if the hash is repeated with the same input, the result is the same output). That is, in a deterministic hash an output is deterministically given by the input, with no margin for variation. In some embodiments, a collision-resistant hash is a hash that produces distinct outputs from different inputs. Accordingly, in a collision-resistant hash two different input strings will not collide into a same output string. In some embodiments, a non-invertible hash is a hash wherein the input is not recoverable from the output. In the first step, a collision-resistant, deterministic, and non-invertible cryptographic hash is found for a selected personal data string. In a second step, the cryptographic hash is replaced with an anonymized, readable identifier that includes a counter, the counter being unique to the selected personal data string. In some embodiments, the 'counter' may be numerical, alphabetical (A, B, C and so on), or even a custom string of whatever format (AA1, AA2, AB1, AB2, and the like). Accordingly, the term 'counter' is not limiting embodiments consistent with the present disclosure to only numerical implementations (e.g., 1, 2, 3, and the like).

Embodiments as disclosed herein include editing text-based documents to anonymize specific plaintext personal data, prior to publication. Accordingly, embodiments as disclosed herein search for, and replace specific plaintext personal data within the document with an anonymous string. Some embodiments include features enabling consistent differentiation between two anonymous strings originating from different personalized strings, throughout the document, and even across different documents that may include the same personal data. Some embodiments include a database where a regular expression is associated with a specific anonymous identifier. The database may be cross-correlated for anonymizing multiple documents, thus guaranteeing consistent results. The personal information is effectively masked out of the database because the correlation is performed using a non-invertible cryptographic hash of the personal data.

Some embodiments include a comparison of the cryptographic hash of each personal string across previous hashes (e.g., stored in the database) prior to replacing the personal strings in the document with the readable identifier associated with the cryptographic hash. Thus, each instance of a unique personal string may be replaced with the same readable identifier, retaining the ability to consistently differentiate personal string A from personal string B, while the personal information in strings A and B is effectively removed. In some embodiments, the readable identifier is a readable, semantically meaningful text string, instead of the cryptographic hash value used to match the personal string. Accordingly, methods as disclosed herein provide anonymized documents including readable and easily parsed plain text files because the personal data is replaced with anonymized, readable placeholders. Thus, anonymized documents published through methods as disclosed herein are suitable for inspection, e.g., by a debugging device or a network administrator.

Additionally, some embodiments correlate each regular expression ('regex') with a pre-selected type (e.g., IP Address, MAC address, E-mail Address, Name, Phone #, and the like) to provide further granularity to the readable identifiers. Accordingly, in some embodiments, the readable identifier references the original type of data that has been anonymized, thus providing an even greater amount of human readability.

Embodiments as disclosed herein rely on usage of a non-invertible cryptographic hashing function, to ensure safety against malicious attacks. In such cases, the personal data is irretrievable, even if an attacker has access to the cryptographic hash values. Furthermore, the collision resistant nature of an appropriate cryptographic hash avoids data collisions by ensuring that two different input strings of personal data are associated with two different cryptographic hash values. On the other hand, an appropriately deterministic cryptographic hash ensures that two cryptographic hashes that are the same are therefore associated with the same personal data string (whether or not the personal data string is recoverable).

In one embodiment of the present disclosure, a computer-implemented method is described that includes identifying a regular expression configured to match at least one string to be anonymized in a document. The computer-implemented method includes selecting a readable identifier as an anonymized reference for a string replacement, determining, in the document, a match string that fits the regular expression, hashing the match string using a collision-resistant, deterministic, non-inverting cryptographic hashing function, and comparing a cryptographic hash of the match string with a database. The database includes multiple previous hashes and multiple corresponding readable identifiers. In response to none of the previous hashes matching the cryptographic hash, the computer-implemented method includes creating a new database record including the cryptographic hash, incrementing a counter in the readable identifier and associating the readable identifier with the new database record, and replacing the match string with the readable identifier, throughout the document.

According to one embodiment, a system is described that includes a memory storing instructions and one or more processors configured to execute the instructions to identify a regular expression configured to match at least one string to be anonymized in a document. The one or more processors also execute instructions to select a readable identifier as an anonymized reference for a string replacement, to determine, in the document, a match string that fits the regular expression, to hash the match string using a collision-resistant, deterministic, and non-inverting cryptographic hashing function, and to compare a cryptographic hash of the match string with a database, the database including multiple previous hashes and multiple corresponding readable identifiers. In response to none of the previous hashes matching the cryptographic hash, the one or more processors execute instructions to create a new database record including the cryptographic hash, to increment a counter in the readable identifier and associating the readable identifier with the new database record, and to replace the match string with the readable identifier, throughout the document.

According to one embodiment, a non-transitory, machine-readable medium is described that includes instructions, which when executed by one or more processors, cause a computer to perform a method. The method includes identifying a regular expression configured to match at least one string to be anonymized in a document, selecting a readable identifier as an anonymized reference for a string replacement, and determining, in the document, a match string that fits the regular expression. The method also includes hashing the match string using a collision-resistant, deterministic, and non-inverting cryptographic hashing function, comparing a cryptographic hash of the match string with a database. The database includes multiple previous hashes and multiple corresponding readable identifiers. In response to none of the previous hashes matching the cryptographic hash, the method includes creating a new database record including the cryptographic hash, incrementing a counter in the readable identifier and associating the readable identifier with the new database record, and replacing the match string with the readable identifier, throughout the document.

In yet other embodiment, a system is described that includes a means for storing commands and a means for executing the commands causing the system to perform a method that includes identifying a regular expression configured to match at least one string to be anonymized in a document, selecting a readable identifier as an anonymized reference for a string replacement, and determining, in the document, a match string that fits the regular expression. The method also includes hashing the match string using a collision-resistant, deterministic, and non-inverting cryptographic hashing function, comparing a cryptographic hash of the match string with a database. The database includes multiple previous hashes and multiple corresponding readable identifiers. In response to none of the previous hashes matching the cryptographic hash, the method includes creating a new database record including the cryptographic hash, incrementing a counter in the readable identifier and associating the readable identifier with the new database record, and replacing the match string with the readable identifier, throughout the document.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

FIG. 1 illustrates an example network architecture 10 suitable for publishing data anonymized documents, according to certain aspects of the disclosure. In some embodiments, network architecture 10 may span a wide range of geo-locations, including multiple continents. In some embodiments, a client device 110 may be a dedicated computer or computer system, such as a server in network architecture 10, a printer, an appliance, or any other device coupled with multiple servers 130 through a network 150. Client device 110 may generate reports and log documentation for one or more servers 130. In some embodiments, the log documentation enables servers 130 to evaluate the performance of client device 110, and assess whether a corrective action, repair, or any other maintenance action is desirable.

Servers 130 and client devices 110 include memory circuits storing instructions which, when executed by one or more processors, cause the devices to perform at least some of the steps in methods as disclosed herein. Network 150 can include, for example, any one or more of a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
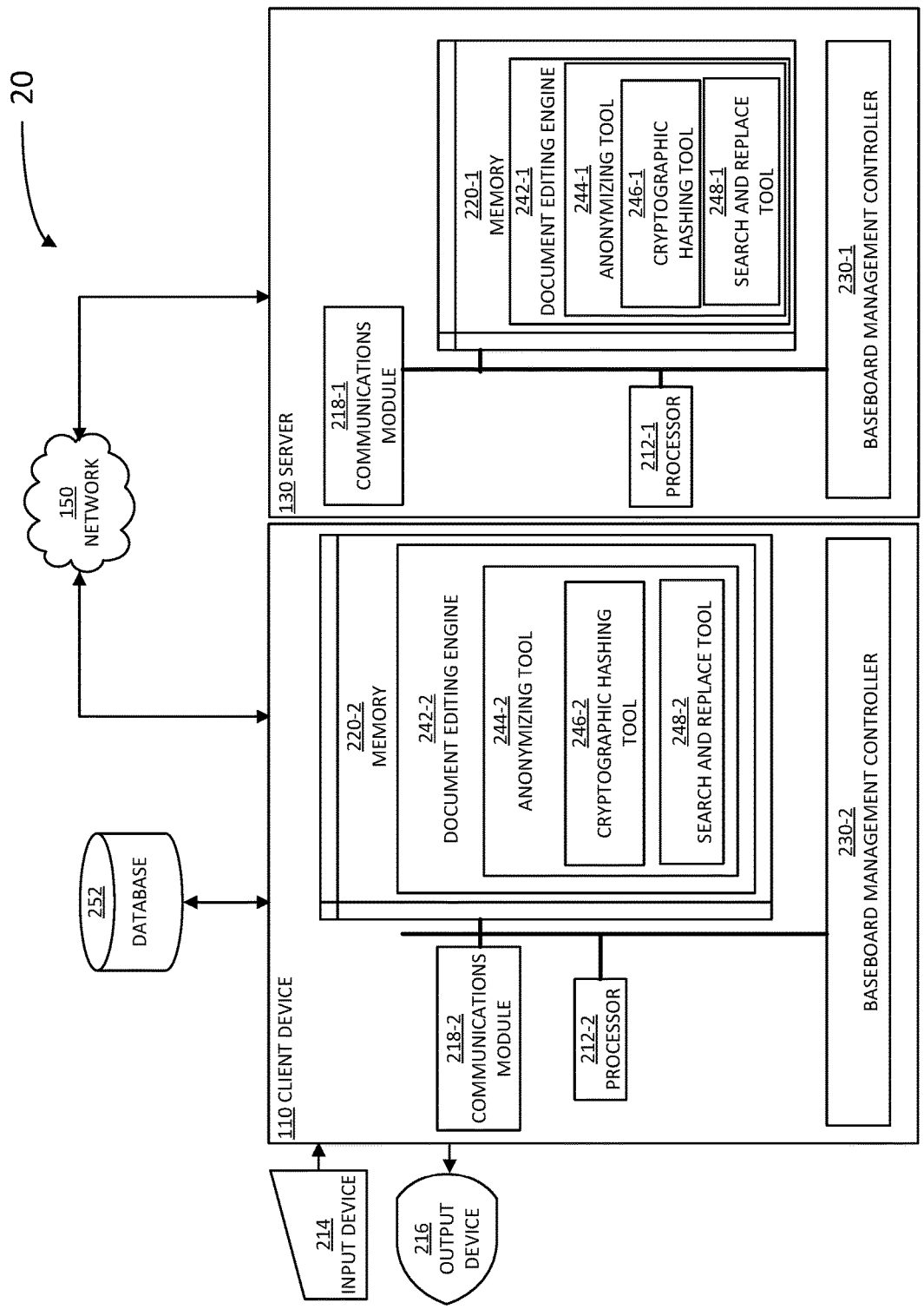
FIG. 2 is an architecture illustrating from the architecture of FIG. 1, according to some embodiments.

FIG. 2 is an architecture 20 illustrating an example client device 110 and a server 130 from the architecture of FIG. 1, according to some embodiments. For example, in some embodiments, client device 110 may include a network host for data storage, and server 130 may include a host for a manufacturer of the data storage, communicatively coupled with client device 110. Server 130 includes a communications module 218-1, a processor 212-1, and a memory 220-1. Memory 220-1 may further include a document editing engine 242-1. In some embodiments, document editing engine 242-1 includes anonymizing tool 244-1, which in turn includes a cryptographic hashing tool 246-1 and a search and replace tool 248-1. In some embodiments, document editing engine 242-1 and the associated tools described above may include a script for parsing text (e.g., as in PERL, JAVA scripts, and the like).

Client device 110 includes processor 212-2, communications module 218-2, and memory 220-2. Similarly to memory 212-1, memory 220-2 may further include a document editing engine 242-2 having an anonymizing tool 244-2, a cryptographic hashing tool 246-2 and a search and replace tool 248-2. In some embodiments, document editing engine 242-2 in client device 110 may perform similar functions as document editing engine 242-1 in server 130. Moreover, in some embodiments, document editing engine 242-2 in client device 110 may be hosted or controlled by document editing engine 242-1 in server 130. Hereinafter, document editing engines 242-1 and 242-2 will be collectively referred to as "document editing engines 242." Likewise, anonymizing tools 244-1 and 244-2 will be collectively referred to, hereinafter, as "anonymizing tools 244." Cryptographic hashing tools 246-1 and 246-2 will be collectively referred to, hereinafter, as "cryptographic hashing tools 246." And search and replace tools 248-1 and 248-2 will be collectively referred to, hereinafter, as "search and replace tools 248." More generally, in some embodiments, architecture 20 may include only one of document editing engines 242 and either of their associated tools, e.g., anonymizing tools 244, cryptographic hashing tools 246, and search and replace tools 248, running either in server 130 or in client device 110. In some embodiments, at least some of the scripts in cryptographic hashing tools 246 and in search and replace tools 248 reside in memory 220-2, or may reside in server 130 and are called upon by request from client device 110.

Client device 110 may also be coupled with an input device 214 and an output device 216. Input device 214 may include a mouse, a keyboard, a touchscreen, and the like. Output device 216 may include a display, a touchscreen, a microphone, and the like. In some embodiments, input device 214 and output device 216 may be included in the same unit (e.g., a touchscreen).

Processors 212-1 and 212-2 will be collectively referred to, hereinafter, as "processors 212." Memories 220-1 and 220-2 will be collectively referred to, hereinafter, as "memories 220." Processors 212 are configured to execute instructions stored in memories 220 to cause client device 110 and server 130 to perform at least partially one or more steps in methods consistent with the present disclosure. Some of these instructions may be stored in document editing engines 242, or in anonymizing tools 244. Furthermore, in some embodiments, a database 252 is communicatively coupled with client device 110 and configured to store data provided by document editing engines 242 or anonymizing tools 244. For example, in some embodiments, database 252 includes lists of cryptographic hashes and associated readable identifiers. Accordingly, in some embodiments, document editing engines 242 may include instructions to compare new cryptographic hashes found in a document with cryptographic hashes previously created and stored in database 252. In some embodiments, the cryptographic hashes may be created by cryptographic hashing tools 246 hosted in anonymizing tool 244. In some embodiments, search and replace tools 248 find a personal data string matching a regular expression pattern within the document. Cryptographic hashing tools 246 then perform a hash on the symbol string. In some embodiments, cryptographic hashing tools 246 include a collision resistant, deterministic, and non-inverting hashing function. In some embodiments, cryptographic hashing tools 246 may include a collision resistant, deterministic, non-inverting hashing algorithm such as a secure hash algorithm (SHA).

In some embodiments, document editing engines 242 search a private document using specific regular expressions indicating personal data strings and replaces the personal data strings with a readable identifier, using search and replace tools 248. In some embodiments, search and replace tool 248 may include text search and replace functions such as 'grep' and 'sed,' in combination with defined regular expressions. Alternate implementations could also use regular expressions with existing string substitution functionality, such as the Perl "s///" operator to perform the requisite substitutions.

In the process of replacing personal data strings, document editing engines 242 may first replace the regular expressions with cryptographic hashes, and then search for the cryptographic hashes in the document and replace them with suitably generated readable identifiers. If the cryptographic hashes, in addition to being appropriately deterministic and collision resistant, are non-invertible, it will be cryptographically infeasible for an attacker to recover the personal data even if the cryptographic hashes are made available.

Communication modules 218-1 and 218-2 will be collectively referred to, hereinafter, as "communication modules 218." Communication modules 218 may include a wireless communication antenna so that client device 110 may locally interact with server 130, or on a device-to-device handshake basis. Communication modules 218 are configured to interface with network 150 to send and receive information, such as data, requests, responses, and commands to other devices on the network. Communication modules 218 include, for example, modems or Ethernet cards.

Figure 3:
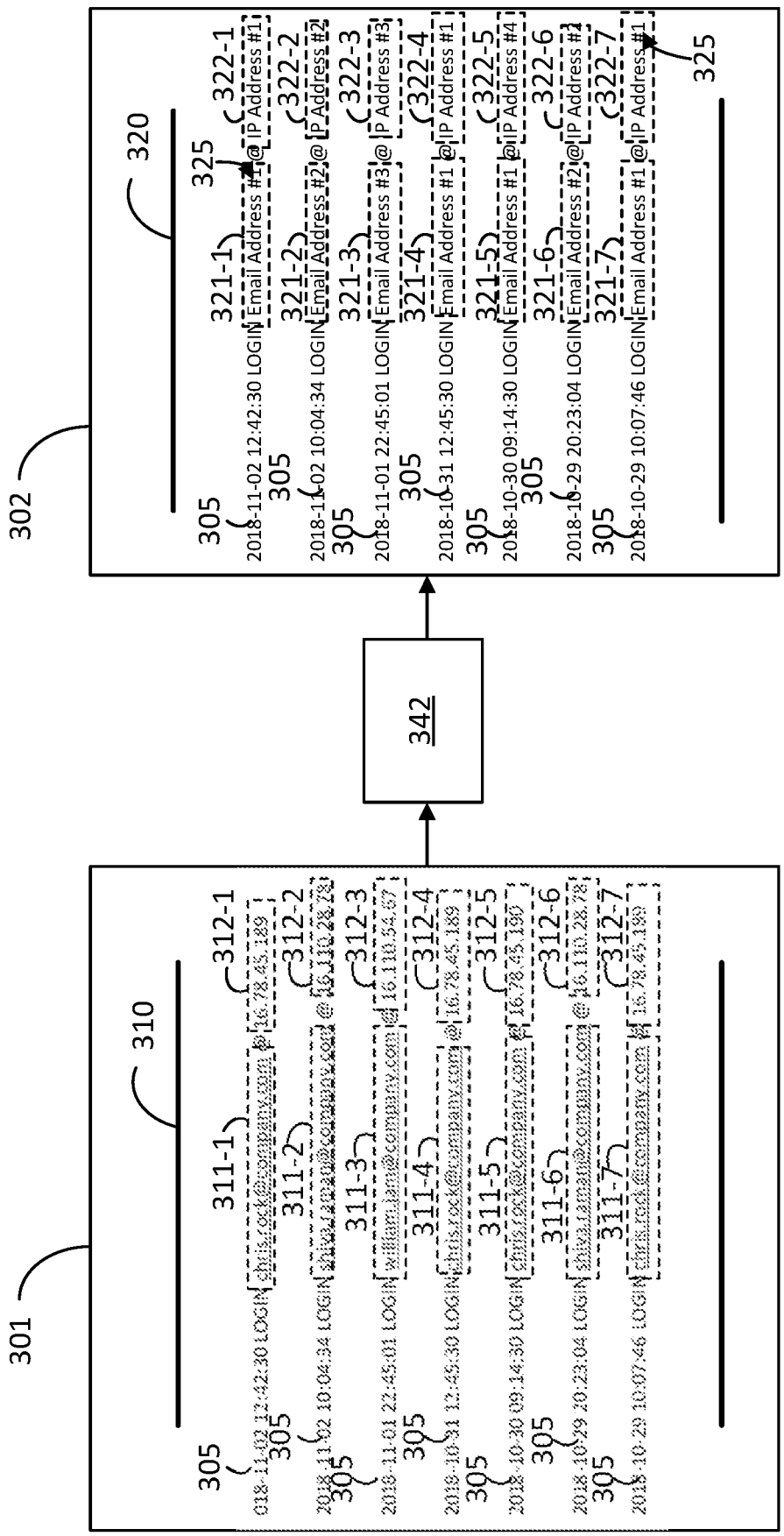
FIG. 3 illustrates a private document processed for data anonymization by a document editing engine, prior to publication as a public document, according to some embodiments.

FIG. 3 illustrates an exemplary private document 301 that is processed for data anonymization by document editing engine 342 (e.g., document editing engines 242), prior to publication as a public document 302, according to some embodiments. In some embodiments, document editing engine 342 creates public document 302 after private document 301 has been created. In yet other embodiments, document engine 342 may create public document 302 simultaneously with, or at almost the same time, as private document 301 is created (e.g., "in-line" anonymization). Further, in some embodiments, the timing of the creation of public document 302 from private document 301 may include creating one or more lines of private document 301, and alternating with creating one or more lines of public document 302. Private document 301 is a plain text document including private text 310 having personal data strings 311-1 through 311-7, and 312-1 through 312-7. For example, personal data strings 311-1, 311-2, 311-3, 311-4, 311-5, 311-6, and 311-7 may include e-mail addresses of individuals (hereinafter, collectively referred to as "e-mail strings 311"). Likewise, personal data strings 312-1, 312-2, 312-3, 312-4, 312-5, 312-6, and 312-7 may include IP addresses of individuals (hereinafter, collectively referred to as "IP strings 312"). Without limitation, private text 310 may include any number of either e-mail strings 311 or IP strings 312. Accordingly, the numbers 1 through 3 may be associated with the same individual, with two different individuals, or with three different individuals, e.g., two or all of e-mail strings 311 and/or two or all of IP strings 312 may be the same (e.g., associated with a same individual). E-mail strings 311 and IP strings 312 may match regular expressions (regular expressions) identified by document editing engine 342 upon selection by a user.

In some embodiments, a baseboard management controller (BMC) 230-1 is configured to implement some of the services and operations of server 130. Likewise, a BMC 230-2 may be configured to implement at least some of the services and operations of client device 110. BMC 230-1 and 230-2 will be collectively referred to, hereinafter, as "BMCs 230." BMCs 230 can be implemented using a separate processor from processors 212. BMCs 230 can provide so-called "lights-out" functionality for server 130 or client device 110. The lights out functionality may allow a user, such as a systems administrator, to perform management operations on server 130 or client device 110, even when an operating system is not installed or not functional.

Moreover, in one example, BMCs 230 can run on auxiliary power, thus server 130 or client device 110 need not be powered on to an 'on' state where control of the computing device is handed over to an operating system after boot. As examples, BMCs 230 may provide so-called "out-of-band" services, such as remote console access, remote reboot and power management functionality, monitoring health of the system, access to system logs, and the like. As used herein, BMCs 230 may have management capabilities for sub-systems of server 130 or client device 110, and be separate from processors 212, which execute a main operating system of server 130 oe client device 110.

As noted, in some instances, BMCs 230 may enable lights-out management of server 130 or client device 110, which provides remote management access (e.g., system console access) regardless of whether server 130 or client device 110 is powered on, whether a primary network subsystem hardware is functioning, or whether an operating system (OS) is operating or even installed. BMCs 230 may include an interface, such as a network interface, and/or serial interface that an administrator can use to remotely communicate with BMCs 230. As used herein, an "out-of-band" service is a service provided by BMCs 230 via a dedicated management channel (e.g., communications modules 218, or a serial interface) and is available whether server 130 or client device 110 is in powered on state or not.

In some embodiments, at least one of BMCs 230 may be included as part of an enclosure. In some embodiments, at least one of BMCs 230 may be included in servers 130 (e.g., as part of the management subsystem of the server) or in client device 110, or connected via an interface (e.g., a peripheral interface). In some examples, sensors associated with BMCs 230 can measure internal physical variables such as humidity, temperature, power supply voltage, communications parameters, fan speeds, operating system functions, or the like. BMCs 230 may also be capable to reboot or power cycle server 130 or client device 110. As noted, BMCs 230 allow for remote management of the device. As such, notifications can be made to a centralized station using BMCs 230 and passwords or other user entry can be implemented via BMCs 230.

In some embodiments, private document 301 may be generated by a storage product (e.g., a network database and the like). Thus, private document 301 may be a document listing the users that log into the product. In some embodiments, the storage product may publish public document 302, e.g., returning the log file to the manufacturer of the storage product for support. Public document 302 contains a public text 320, which is semantically equivalent to private text 310, without personalized e-mail strings 311 and IP addresses 312. Accordingly, it is desirable to transform private document 301 into public document 302. Further, for the purpose of support and maintenance by the manufacturer, it is desirable that public document 302, in addition to not having any personal data strings 311 or 312, replaces those with readable identifiers that make semantic sense. For example, it is desirable that any one of e-mail identifiers 321-1, 321-2, 321-3, 321-4, 321-5, 321-6, and 321-7 replacing e-mail strings 311 have a string "e-mail address" attached to it, with a counter 325 (e.g., e-mail #1 and so on). Counter 325 may be a consecutive numeric string, an alphabetically arranged string, or an alphanumeric string, without limitation. Likewise, IP address identifiers 322-1, 322-2, 322-3, 322-4, 322-5, 322-6, and 322-7 replace IP strings 312 with a readable identifier that is semantically consistent with IP strings 312, and a counter 325 (e.g., IP address #1 and so on). E-mail identifiers 321-1 through 321-7 will be collectively referred to, hereinafter, as "e-mail identifiers 321." Likewise, IP identifiers 322-1 through 322-7 will be collectively referred to, hereinafter, as "IP identifiers 322." Furthermore, e-mail identifiers 321 and IP identifiers 322 will be collectively referred to, hereinafter, as "readable identifiers 321 and 322."

In some embodiments, private document 310 may include a portion having a format as follows:

"Timestamp LOGIN 305 [e-mail address 311] @ [ip address 312]"

To replace e-mail address strings 311 and IP strings 312 with anonymized, readable identifiers 321 and 322, respectively, document editing engine 342 specifies two regular expressions with corresponding readable identifiers. The two regular expressions may be coded into a text search algorithm, as shown in TABLE I.

TABLE I

| Regular Expression | Readable Identifier |
| --- | --- |
| \b[A-Z0-9._%+-]+@[A-Z0-9.-]+\.[A-Z]{2,}\b | E-mail Address |
| \b(25[0-5]\|2[0-4][0-9]\|1[0-9][0-9]\|[1-9]?[0-9])\.(25[0-5]\|2[0-4][0-9]\|1[0-9][0-9]\|[1-9]?[0-9])\.(25[0-5]\|2[0-4][0-9]\|1[0-9][0-9]\|[1-9]?[0-9])\.(25[0-5]\|2[0-4][0-9]\|1[0-9][0-9]\|[1-9]?[0-9])\b | IP Address |

The first command line in TABLE I causes document editing engine 342 to search private text 310 for text strings in the form of an e-mail address, e.g., to find e-mail strings 311.

As an example, e-mail string 311-1 may be "chris.rock@company.com." Document editing engine 342 may use a cryptographic hashing tool (e.g., cryptographic hashing tool 246) to generate the following hash:

$$\text{chris.rock@company.com} = \\ \text{9BFA3EC86FBF3A021017A404A391555B1848683C3-} \\ \text{C4DDF12B73A536F2D63A0BD} \quad (1)$$

Document editing engine 342 maps hash (1) to a corresponding readable identifier (e.g., e-mail address/IP address, adding a counter 325, such as, e-mail address #1 (321-1), $$\text{9BFA3EC86FBF3A021017A404A391555B18} \\ \text{48683C3C4DDF12B73A536F2D63A0BD} = \text{e-} \\ \text{mail address \#1} \quad (2)$$

Document editing engine 342 performs a search and replace e-mail string 311-1 with e-mail identifier 321-1 throughout private document 301; thus, the first line in private text 310 may read as: "2018-11-02 12:42:30 LOGIN E-mail Address #1 @ 16.78.45.189." This text still contains private data in IP string 312-1 "16.78.45.189." Accordingly, document editing engine 342 performs a search for the regular expression matching IP address data strings, and then creates a hash (e.g., using a hashing algorithm such as SHA) for IP string 312-1. Thereafter, document editing engine 342 replaces the associated hash with IP identifier 322-1: "IP address #1." The resulting string association is as follows:

$$\text{2018-11-0212:42:30 LOGIN} \\ \text{chris.rock@company.com@16.78.45.189} = \text{2018-} \\ \text{11-0212:42:30 LOGIN E-mail Address \#1@IP} \\ \text{Address \#1} \quad (3)$$

Document editing engine 342 iterates Eqs. (1-3) through the remaining e-mail strings 311 and IP strings 312 of personal data to obtain public text 320. The resulting string in Eq. (3) distinguishes between different personal data strings (e.g., e-mails and IP addresses), while eliminating any personal information. Also, the resulting string in Eq. 3 is readable and easily parsed.

Embodiments consistent with the present disclosure may be applicable for in-line anonymization applications, wherein public document 302 may be created and anonymized in parallel with private document 301. Accordingly, Eqs. (1-3) may be applied line by line, without searching for the entire private document 301. For example, a device may be logging information in the format "TIMESTAMP EMAIL ADDRESS." Accordingly, document editing engine 342 may proactively replace the string EMAIL ADDRESS with the readable identifier, using Eqs. (1-3).

Figure 4:
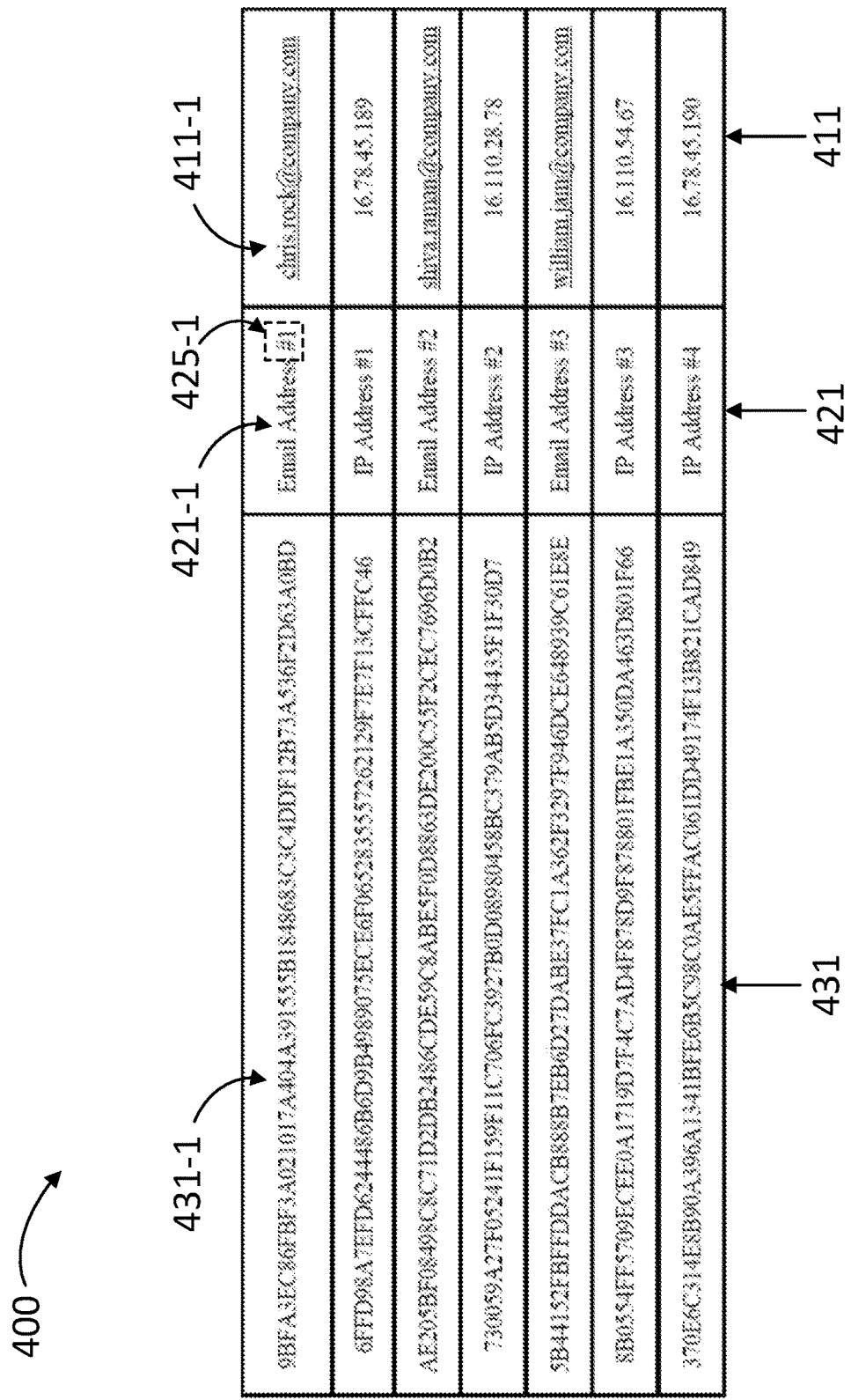
FIG. 4 illustrates a table with a personal data column, a readable identifier column, and a cryptographic hash column, according to some embodiments.

FIG. 4 illustrates a table 400 with a personal data column 411, a readable identifier column 421, and a cryptographic hash column 431, according to some embodiments. Personal data column 411 includes different entries with personal data, which may correspond to e-mails and IP addresses (e.g., e-mail strings 311 and IP strings 312). Elements in each of columns 411, 421, and 431 are individually referred to, hereinafter, by indicating the row in which they appear. Accordingly, the first e-mail string "chris.rock@company.com" is indicated as e-mail string 411-1. The corresponding readable identifier is "E-mail address #1" 421-1, with an associated counter "#1" 425-1. The associated cryptographic hash: "9BFA3EC86FBF3A021017A404A391555B184868-3C3C4DDF12B73A536F2D63A0BD" is referred to as cryptographic hash 431-1.

Table 400 may be generated by a document editing engine (e.g., document editing engine 342) located within the storage product, and table 400 may be stored in the storage product together with all of the cryptographic hashes 431, regular expressions in personal data column 411, and readable identifiers 421. In some embodiments, only the public document including readable identifiers 421 will leave the storage product. Further, in some embodiments, personal data column 411 is not stored in any database (either at the storage product or client device, in a private database, or in a remote server). In some embodiments, personal data column 411 may be maintained within the client device as a reference in a private database. In some embodiments, table 400 may be used to pseudonymize further private documents created by the client device, with the addition of appropriate privacy controls.

Figure 5:
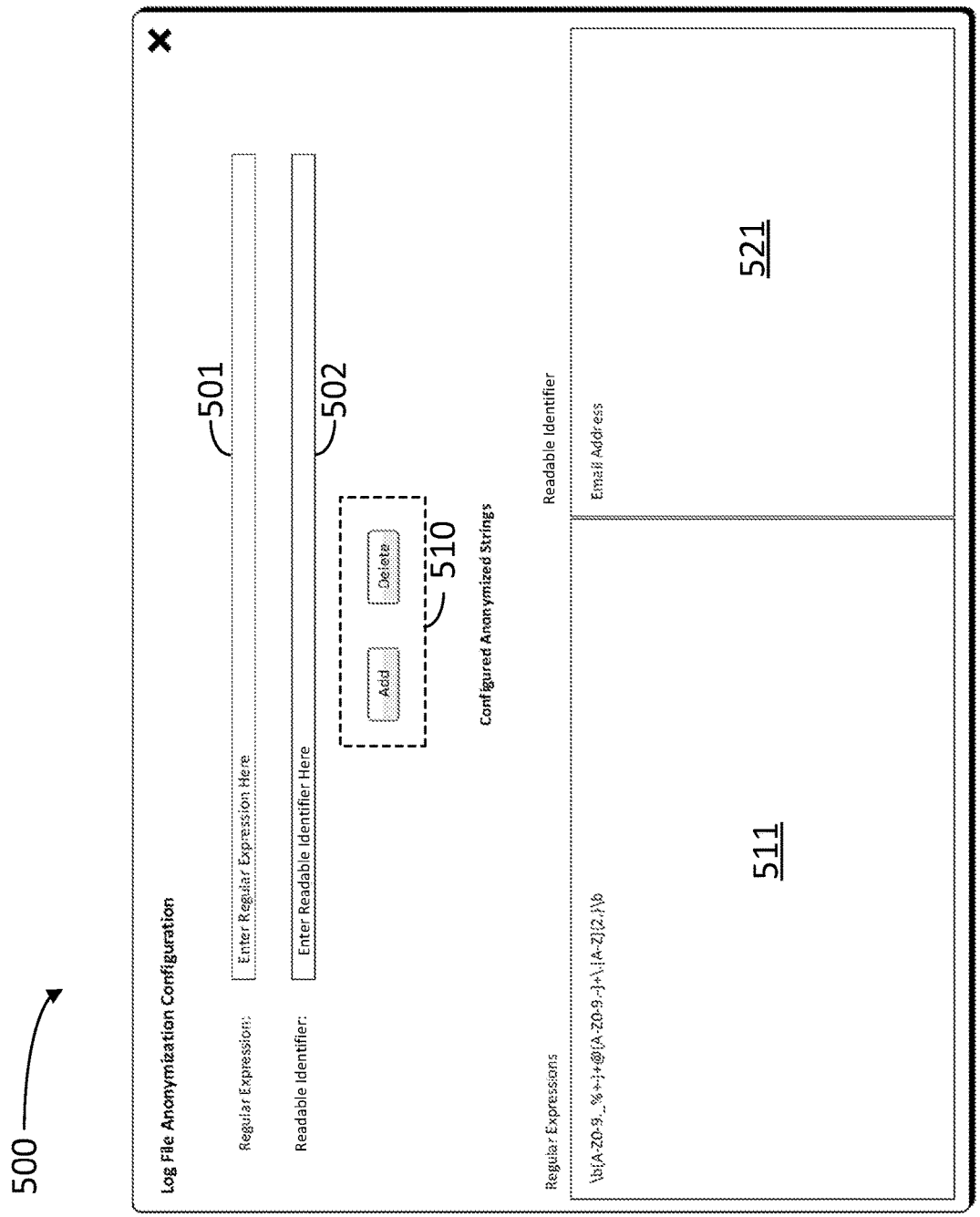
FIG. 5 illustrates a graphic user interface in a platform for anonymizing a document prior to publication, according to some embodiments.

FIG. 5 illustrates a graphic user interface (GUI) 500 in a platform for anonymizing a document prior to publication, according to some embodiments. GUI 500 may be used in the anonymization of plaintext log files created by a general computing device, such as a server or storage array. In some embodiments, GUI 500 may run on the client device (e.g., processor 212-2 in client device 110). The client device may include a storage array, such that any log files retrieved from the storage array are anonymized to remove personal data according to the ruleset identified by the regular expressions and their corresponding readable identifier types (e.g., e-mail address, IP address, and the like).

GUI 500 includes a field 501 to enter a regular expression, as defined by the user. The regular expression entered in field 501 may include any one of the definitions consistent with the present disclosure (c.f., TABLE I). A field 502 includes the type of regular expression value that will be searched (e.g., whether an e-mail address or an IP address, and the like). "Add" and "Delete" tabs 510 enable the user to include more strings to be replaced. Fields 511 and 521 display the entered regular expressions and their corresponding readable identifier, according to some embodiments.

Figure 6:
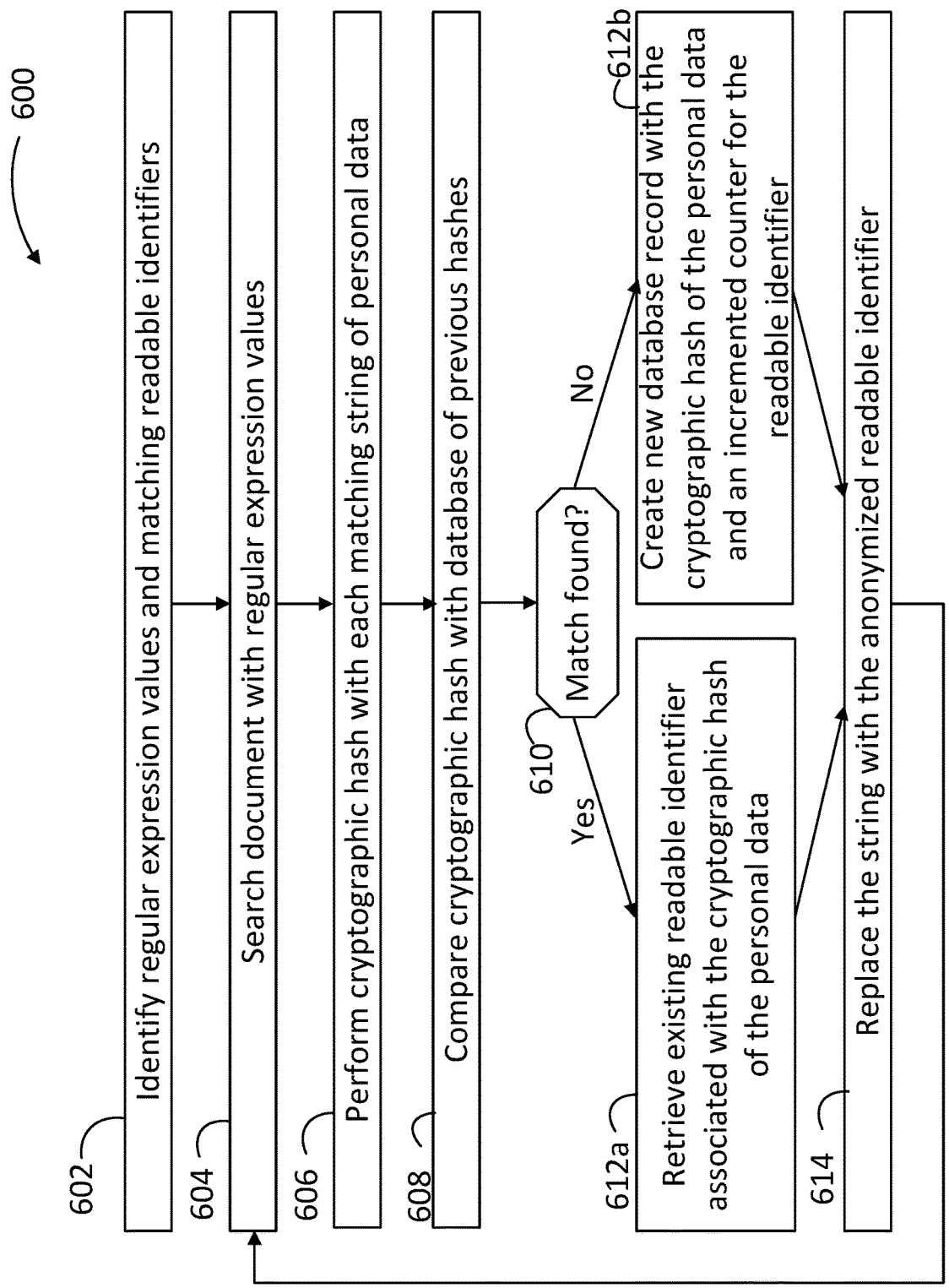
FIG. 6 is a flow chart illustrating steps in a method for data anonymization by an editor, according to some embodiments.

FIG. 6 is a flow chart illustrating steps in a method 600 for data anonymization by an editor, according to some embodiments. Method 600 may be performed at least partially by any one of a client device communicatively coupled with a server or a network device (e.g., any one of client device 110, and server 130). Accordingly, steps in method 600 may be performed by one or more processors executing instructions stored in a memory (e.g., processors 212 and memories 220). The client device may be hosting a document editing engine configured to perform cryptographic hashes, parsing documents, search and replacement tools, or configuring a controller in the network (e.g., document editing engines 242, anonymizing tools 244, cryptographic hashing tools 246, and search and replace tools 248). In some embodiments, the client device may be communicatively coupled with a database to store a table including previously created cryptographic hashes, and the corresponding anonymized, readable identifiers associated with specific counters (e.g., database 252, table 400, cryptographic hashes 431, readable identifiers 421, and counters 425). The client device may be handled by a user, wherein the user may be a client of a network (e.g., network 150). At least some of the steps in method 600 may be performed by a computer having a processor executing commands stored in a memory of the computer (e.g., processors 212 and memories 220). Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

Step 602 includes identifying regular expression values and matching readable identifiers (IDs). The regular expression values may be an e-mail string format, and IP address string format, and the like (cf. TABLE 1). The regular expression values match personal data to be anonymized.

Step 604 includes searching the document with regular expression and readable identifiers. In some embodiments, step 604 includes using the search and replace tool in the document editing engine to find the identified regular expression and readable identifiers throughout the document.

Step 606 includes performing a cryptographic hash of each matching string of personal data. In some embodiments, step 606 may include hashing each matching string so that the same output string results for the same matching string. In addition, in some embodiments step 606 includes hashing each matching string so that different matching strings are hashed into different output strings.

Step 608 includes comparing the cryptographic hash with a database of previous hashes. In some embodiments, the database of previous hashes includes the table with a readable identifier column and a cryptographic hash column (cf. TABLE 1).

Step 610 includes determining whether a match is found, within the document. In some embodiments, step 610 includes using the search and replace tool in the document editing engine of the client device.

When the match is found, according to step 610, step 612*a* includes retrieving the existing readable identifier associated with the cryptographic hash of the personal data.

When the match is not found, according to step 610, step 612*b* includes creating a new database record including the cryptographic hash of the personal data along with an incremented counter for the readable identifier.

Step 614 includes replacing the string with the anonymized readable identifier. In some embodiments, step 614 includes using the search and replace tool in the document editing engine of the client device.

Figure 7:
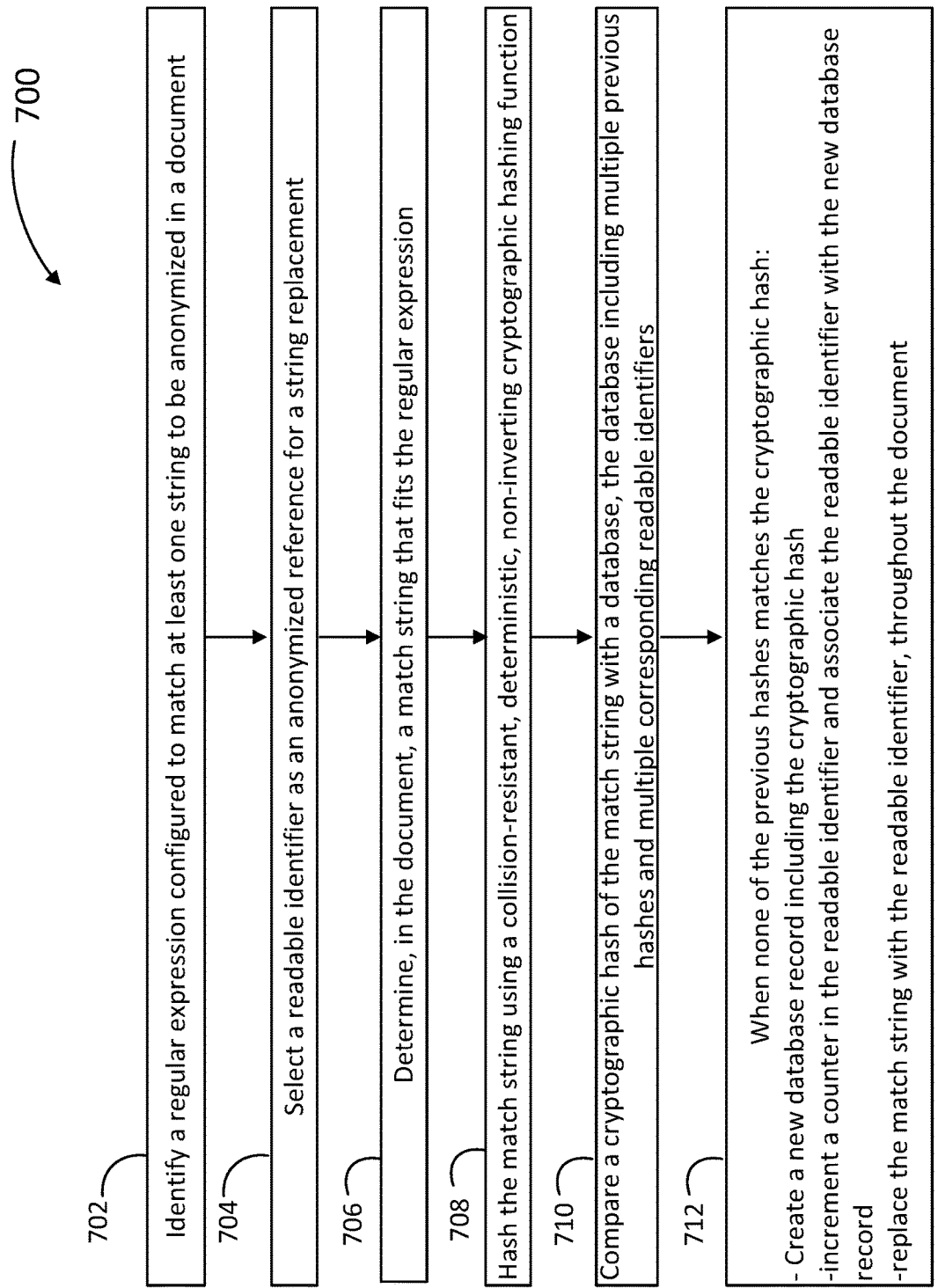
FIG. 7 is a flow chart illustrating steps in a method for anonymizing a document prior to publication, according to some embodiments.

FIG. 7 is a flow chart illustrating steps in a method 700 for anonymizing a document prior to publication, according to some embodiments. Method 700 may be performed at least partially by any one of a client device communicatively coupled with a server or a network device (e.g., any one of client device 110, and server 130). Accordingly, steps in method 700 may be performed by one or more processors executing instructions stored in a memory (e.g., processors 212 and memories 220). The client device may be hosting a document editing engine configured to perform cryptographic hashes, parsing documents, search and replacement tools, or configuring a controller in the network (e.g., document editing engines 242, anonymizing tools 244, cryptographic hashing tools 246, and search and replace tools 248). In some embodiments, the client device may be communicatively coupled with a database to store a table including previously created cryptographic hashes, and the corresponding anonymized, readable identifiers associated with specific counters (e.g., database 252, table 400, cryptographic hashes 431, readable identifiers 421, and counters 425). The client device may be handled by a user, wherein the user may be a client of a network (e.g., network 150). At least some of the steps in method 700 may be performed by a computer having a processor executing commands stored in a memory of the computer (e.g., processors 212 and memories 220). Methods consistent with the present disclosure may include at least some, but not all, of the steps illustrated in method 700, performed in a different sequence. Furthermore, methods consistent with the present disclosure may include at least two or more steps as in method 700 performed overlapping in time, or almost simultaneously.

Step 702 includes identifying a regular expression configured to match at least one string to be anonymized in a document. In embodiments wherein the document is a log of a network server, step 702 may further include configuring the regular expression to identify an IP address in the log of the network server. In some embodiments, step 702 includes providing a graphic user interface to receive the regular expression from a user.

Step 704 includes selecting a readable identifier as an anonymized reference for a string replacement. For example, in some embodiments step 704 includes selecting "e-mail address #N" (where N is the counter value) as the readable identifier for replacing an e-mail address, or selecting "IP address #N" for replacing an IP address.

Step 706 includes determining, in the document, a match string that fits the regular expression. In some embodiments, step 706 includes searching the document for a string that matches the regular expression. In embodiments wherein the document is a text document, step 706 includes implementing search and replace text functions on the text document. In some embodiments, step 706 includes identifying the match string that fits the regular expression in a single line of the document, as the document is being created.

Step 708 includes hashing the match string using a collision resistant, deterministic, and non-inverting cryptographic hashing function. In some embodiments, step 708 may include hashing the match string so that the same output string results for a same match string. In addition, in some embodiments step 708 includes hashing the match string so that different match strings are hashed into different output strings. Moreover, in some embodiments step 708 includes hashing the match string so that the match string is not recoverable from the output string.

Step 710 includes comparing a cryptographic hash of the match string with a database, the database including multiple previous hashes and multiple corresponding readable identifier. In some embodiments, the multiple corresponding readable identifiers include readable identifiers for multiple documents, and step 710 includes finding a matching cryptographic string corresponding to a second document.

Step 712 includes, in response to none of the previous hashes matching the cryptographic hash, creating a new database record including the cryptographic hash. Step 712 also includes, in response to none of the previous hashes matching the cryptographic hash, incrementing a counter in the readable identifier and associating the readable identifier with the new database record and replacing the match string with the readable identifier, throughout the document. In some embodiments, step 712 includes retrieving an existing readable identifier associated with the cryptographic hash, when a previous cryptographic hash in the database matches the cryptographic hash and replacing the matching string with the existing readable identifier, throughout the document. In some embodiments, step 712 includes replacing the matching string with the new or existing readable identifier in a single line of the document, as the document is created. In embodiments wherein the document is a log file created by a general computing device, step 712 may include transmitting the document to a remote server for analysis of a performance of the general computing device based on the log file. In some embodiments, step 712 includes verifying a semantic consistency of the document after replacing the match string with the readable identifier. In some embodiments, step 712 includes verifying that the document is free of personalized regular expressions.

Hardware Overview

Figure 8:
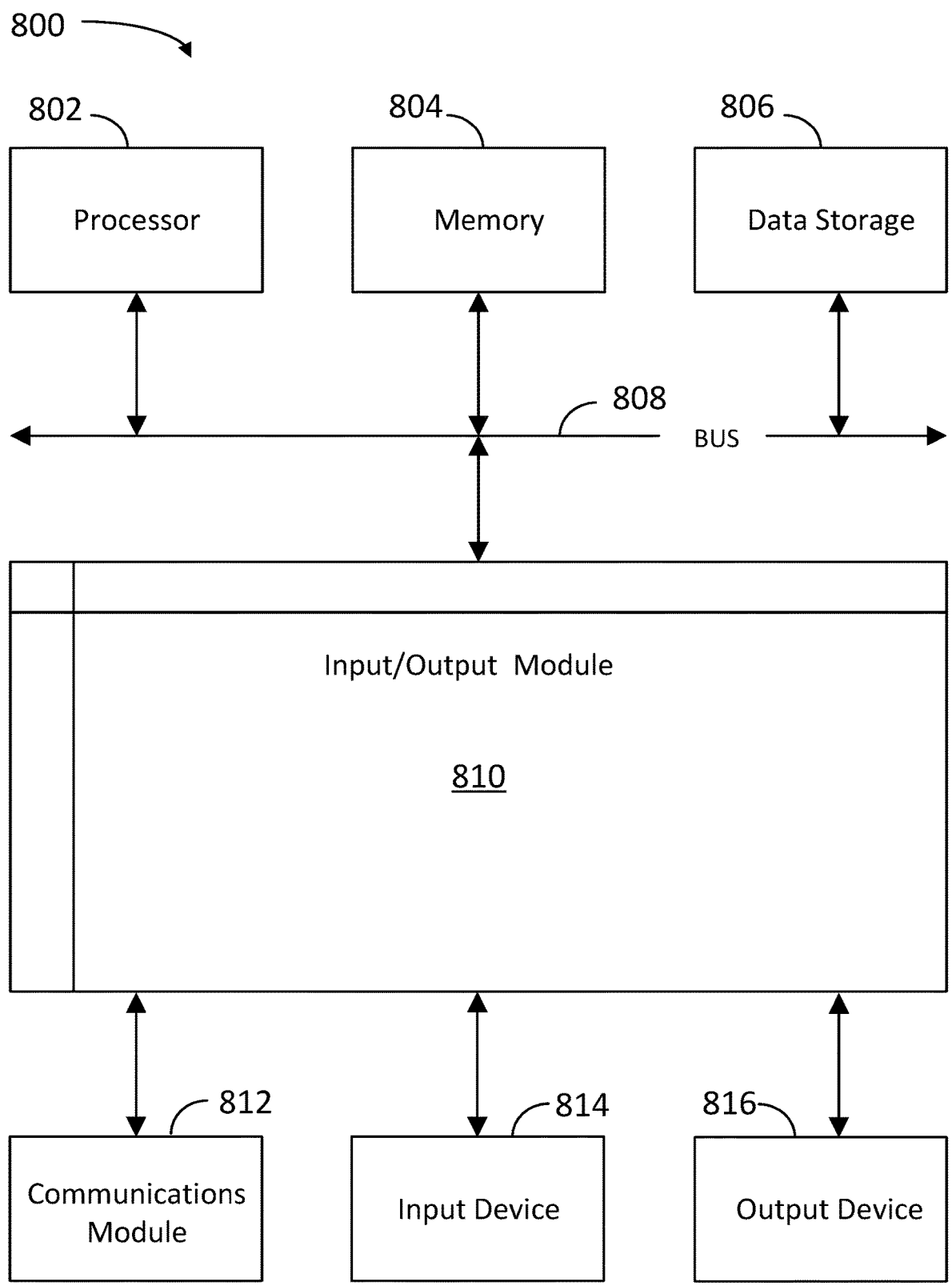
FIG. 8 is a block diagram illustrating an example computer system with which the client and network device of FIG. 1 and the methods of FIGS. 6-7 can be implemented.

FIG. 8 is a block diagram illustrating an exemplary computer system 800 with which the client device 110 and servers 130 of FIGS. 1-2, and the methods of FIGS. 6-7, can be implemented. In certain aspects, the computer system 800 may be implemented using hardware or a combination of software and hardware, either in a dedicated network device, or integrated into another entity, or distributed across multiple entities.

Computer system 800 (e.g., client device 110 and server 130) includes a bus 808 or other communication mechanism for communicating information, and a processor 802 (e.g., processors 212) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

A computer program as discussed herein does not necessarily correspond to a file in a file system. A program can be stored in a portion of a file that holds other programs or data (e.g., one or more scripts stored in a markup document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage 806 such as a magnetic disk or optical disk, coupled to bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 (e.g., communication modules 218) include networking interface cards, such as Ethernet cards and modems. In certain aspects, input/output module 810 is configured to connect to a plurality of devices, such as an input device 814 (e.g., input device 214) and/or an output device 816 (e.g., output device 216). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as an LCD (liquid crystal display) monitor, for displaying information to the user.

According to one aspect of the present disclosure, methods 600 and 700 can be implemented using a computer system 800 in response to processor 802 executing one or more sequences of one or more instructions contained in memory 804. Such instructions may be read into memory 804 from another machine-readable medium, such as data storage 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data network device, or that includes a middleware component, e.g., an application network device, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a branch office, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and network devices. A client and network device are generally remote from each other and typically interact through a communication network. The relationship of client and network device arises by virtue of computer programs running on the respective computers and having a client-network device relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage 806. Volatile media include dynamic memory, such as memory 804. Transmission media include coaxial cables, copper wire, and fiber optics, including the wires forming bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
    identifying a regular expression configured to match a string to be anonymized in a document;
    selecting a first readable identifier as an anonymized reference for a string replacement;
    determining, in the document, a match string that fits the regular expression;
    hashing the match string to produce a cryptographic hash using a cryptographic hashing function;
    comparing the cryptographic hash of the match string with a database, the database including multiple previous hashes and multiple corresponding readable identifiers that map to respective previous hashes of the multiple previous hashes, wherein each readable identifier of the multiple corresponding readable identifiers included in the database comprises a respective counter; and
    in response to none of the multiple previous hashes in the database matching the cryptographic hash:
        creating, in the database, a new database record including the cryptographic hash;

updating a counter in the first readable identifier to produce an updated readable identifier, and including the updated readable identifier morin the new database record that includes the cryptographic hash;

replacing, in the document, each instance of multiple instances of the match string with the cryptographic hash, such that the document includes plural occurrences of the cryptographic hash; and after the replacing of each instance of the multiple instances of the match string with the cryptographic hash, searching the document for each occurrence of the cryptographic hash and replacing each occurrence of the plural occurrences of the cryptographic hash in the document with the updated readable identifier.

2. The computer-implemented method of claim 1, further comprising:

identifying a second regular expression configured to match a second string to be anonymized in the document;

selecting a second readable identifier as an anonymized reference for a string replacement of the second string;

determining, in the document, a second match string that fits the second regular expression;

hashing the second match string to produce a second cryptographic hash using the cryptographic hashing function;

comparing the second cryptographic hash of the second match string with the database; and in response to a first previous hash of the multiple previous hashes matching the second cryptographic hash:

retrieving, from a database record that contains the first previous hash, a second readable identifier that maps to the first previous hash; and replacing each instance of the second matching string in the document with the second readable identifier in the document.

3. The computer-implemented method of claim 1, wherein the updated readable identifier includes a representation of a type associated with the regular expression.

4. The computer-implemented method of claim 3, wherein the updated readable identifier comprises the representation appended with the counter of the updated readable identifier.

5. The computer-implemented method of claim 1, wherein the updating of the counter comprises incrementing the counter to produce an incremented count, and wherein the updated readable identifier contains the incremented count.

6. The computer-implemented method of claim 1, wherein the document comprises a log of a network server, the computer-implemented method further comprising configuring the regular expression to identify at least one of an internet protocol address or an e-mail address in the log of the network server.

7. The computer-implemented method of claim 1, wherein the document comprises a text document, and the computer-implemented method comprising searching the document for the match string that fits the regular expression by using a search and replace text function on the text document.

8. The computer-implemented method of claim 1, wherein the multiple corresponding readable identifiers include readable identifiers for multiple documents, and the comparing of the cryptographic hash of the match string with the database comprises finding matching previous hashes for match strings in the multiple documents.

9. The computer-implemented method of claim 1, wherein the document comprises a log file created by a computing device, the computer-implemented method further comprising transmitting the document to a remote server for analysis of a performance of the computing device based on the log file.

10. The computer-implemented method of claim 1, wherein the database does not contain strings to be anonymized.

11. A system comprising:

a processor; and a non-transitory storage medium storing instructions executable on the processor to:

identify a regular expression configured to match a string to be anonymized in a document;

select a first readable identifier as an anonymized reference for a string replacement;

determine, in the document, a match string that fits the regular expression;

hash the match string to produce a cryptographic hash using a hashing function;

compare the cryptographic hash of the match string with a database, the database including multiple previous hashes and multiple corresponding readable identifiers that map to respective previous hashes of the multiple previous hashes, wherein each readable identifier of the multiple corresponding readable identifiers included in the database comprises a respective counter; and in response to none of the multiple previous hashes in the database matching the cryptographic hash:

create, in the database, a new database record including the cryptographic hash;

update a counter in the first readable identifier to produce an updated readable identifier, and include the updated readable identifier in the new database record that includes the cryptographic hash;

replace, in the document, each instance of multiple instances of the match string with the cryptographic hash, such that the document includes plural occurrences of the cryptographic hash; and after the replacing of each instance of the multiple instances of the match string with the cryptographic hash, search the document for each occurrence of the cryptographic hash and replace each occurrence of the plural occurrences of the cryptographic hash in the document with the updated readable identifier.

12. The system of claim 11, wherein the instructions are executable on the processor to:

identify a second regular expression configured to match a second string to be anonymized in the document;

select a second readable identifier as an anonymized reference for a string replacement of the second string;

determine, in the document, a second match string that fits the second regular expression;

hash the second match string to produce a second cryptographic hash using the hashing function;

compare the second cryptographic hash of the second match string with the database; and in response to a first previous hash of the multiple previous hashes matching the second cryptographic hash:

retrieve, from a database record that contains the first previous hash, a second readable identifier that maps to the first previous hash; and replace each instance of the second matching string with the second readable identifier in the document.

13. The system of claim 11, wherein the document comprises a log of a network server, and the instructions are executable on the processor to configure the regular expression to identify an internet protocol address in the log of the network server.

14. The system of claim 11, wherein the instructions are executable on the processor to provide a graphic user interface to receive the regular expression from a user.

15. The system of claim 11, wherein the database does not contain strings to be anonymized.

16. A non-transitory computer-readable medium comprising instructions that upon execution cause a computer to:

identify a regular expression configured to match a string to be anonymized in a document;

select a first readable identifier as an anonymized reference for a string replacement of the string;

determine, in the document, a match string that fits the regular expression;

hash the match string to produce a cryptographic hash using a cryptographic hashing function;

compare the cryptographic hash of the match string with a database, the database including multiple previous hashes and multiple corresponding readable identifiers that map to respective previous hashes of the multiple previous hashes, wherein each readable identifier of the multiple corresponding readable identifiers included in the database comprises a respective counter;

in response to none of the multiple previous hashes in the database matching the cryptographic hash:

create, in the database, a new database record including the cryptographic hash;

update a counter in the first readable identifier to produce an updated readable identifier, and include the updated readable identifier in the new database record that includes the cryptographic hash;

replace, in the document, each instance of multiple instances of the match string with the cryptographic hash, such that the document includes plural occurrences of the cryptographic hash; and after the replacing of each instance of the multiple instances of the match string with the cryptographic hash, search the document for each occurrence of the cryptographic hash and replace each occurrence of the plural occurrences of the cryptographic hash in the document with the updated readable identifier.

17. The non-transitory computer-readable medium of claim 16, wherein the instructions upon execution cause the computer to:

identify a second regular expression configured to match a second string to be anonymized in the document;

select a second readable identifier as an anonymized reference for a string replacement of the second string;

determine, in the document, a second match string that fits the second regular expression;

hash the second match string to produce a second cryptographic hash using the cryptographic hashing function;

compare the second cryptographic hash of the second match string with the database; and in response to a first previous hash of the multiple previous hashes matching the second cryptographic hash:

retrieve, from a database record that contains the first previous hash, a second readable identifier that maps to the first previous hash; and replace each instance of the second matching string with the second readable identifier in the document.

18. The non-transitory computer-readable medium of claim 16, wherein the document comprises log information, and the instructions upon execution cause the computer to perform a status check of a network server based on the log information including the updated readable identifier.

19. The non-transitory computer-readable medium of claim 16, wherein the database does not contain strings to be anonymized.

* * * * *